United States Patent
Benco et al.

(10) Patent No.: US 8,874,076 B2
(45) Date of Patent: Oct. 28, 2014

(54) METHOD TO ALLOW COMMUNITY-IDENTITY BASED COMMUNICATIONS USING MOBILE PHONES

(75) Inventors: David S. Benco, Winfield, IL (US); Mark A. Ristich, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1600 days.

(21) Appl. No.: 12/070,222

(22) Filed: Feb. 15, 2008

(65) Prior Publication Data

US 2009/0209231 A1 Aug. 20, 2009

(51) Int. Cl.
| | |
|---|---|
| H04M 1/66 | (2006.01) |
| H04M 1/68 | (2006.01) |
| H04M 3/16 | (2006.01) |
| H04L 29/06 | (2006.01) |
| H04M 3/42 | (2006.01) |
| H04L 29/08 | (2006.01) |

(52) U.S. Cl.
CPC ........ *H04L 63/0414* (2013.01); *H04L 63/0421* (2013.01); *H04M 3/42008* (2013.01); *H04L 67/24* (2013.01)
USPC .......................................................... 455/410

(58) Field of Classification Search
USPC ............... 455/416, 410, 411, 404.2
See application file for complete search history.

(56) References Cited

U.S. PATENT DOCUMENTS

| | | | |
|---|---|---|---|
| 6,564,261 B1 | 5/2003 | Gudjonsson | |
| 2003/0135624 A1* | 7/2003 | McKinnon et al. ........... | 709/228 |
| 2005/0026628 A1* | 2/2005 | Fujiwara .................... | 455/456.1 |
| 2005/0246419 A1 | 11/2005 | Jaatinen | |
| 2007/0149182 A1* | 6/2007 | Muratore et al. ............. | 455/417 |
| 2007/0224998 A1* | 9/2007 | Kimbrell ........................ | 455/445 |
| 2009/0209231 A1* | 8/2009 | Benco et al. .................. | 455/410 |

FOREIGN PATENT DOCUMENTS

WO    WO 01/31903    5/2001

OTHER PUBLICATIONS

Peterson, Neustar J.; A Privacy Mechanism for the Session Initiation Protocol; IETF Standard, Internet Engineering Task Force, IETF, CH; Nov. 1, 2002; XP015009091.
IETF, CH, vol. sip, No. 4; Feb. 27, 2002; XP015028009.

* cited by examiner

*Primary Examiner* — Kwasi Karikari

(74) *Attorney, Agent, or Firm* — Carmen Patti Law Group, LLC

(57) ABSTRACT

An apparatus in one example has: first user equipment having a first set of personal information for use in a community based network, and a second set of personal information for use in a public network; second user equipment having a first set of personal information for use in the community based network, and a second set of personal information for use in the public network; a trusted presence system in an IMS network operatively coupled to the first and second user equipment; and the trusted presence system being structured such that, when the first user equipment is in the community based network places a call to the second user equipment in the public network, the second set of personal information of the second user equipment is withheld from the first user equipment at least during call setup.

19 Claims, 3 Drawing Sheets

METHOD TO ALLOW COMMUNITY-IDENTITY BASED COMMUNICATIONS USING MOBILE PHONES

TECHNICAL FIELD

The invention relates generally to telecommunication networks, and more particularly to a system that provides personal information security regarding social networks and community based networks.

BACKGROUND

Second Life is an Internet-based virtual world launched in 2003. A downloadable client program called the Second Life Viewer enables its users, called "Residents", to interact with each other through motional avatars, providing an advanced level of a social network service combined with general aspects of a metaverse. These are environments where humans interact (as avatars) with each other (socially and economically) and with software agents in a cyber space, that uses the metaphor of the real world, but without its physical limitations. Residents can explore, meet other Residents, socialize, participate in individual and group activities, create and trade items (virtual property) and services from one another.

Within Second Life, there are two main methods of text-based communication: local chat, and global "instant messaging" (known as IM). Chatting is used for public localized conversations between two or more avatars, and can be "heard" within 20 m. IM is used for private conversations, either between two avatars, or among the members of a group. Unlike chatting, IM communication does not depend on the participants being within a certain distance of each other.

The Internet today supports a large number of Social Networking (SN) and Community of Interest web sites. Many of these sites allow their members to communicate with each other via VoIP, IM, or video. This mechanism works well for PC-based communications; however, it would be desirable to allow communications to mobile devices while limiting the identity profile information to that which was divulged to the SN site. For example, one may choose to be known only by a "handle" or other alias, and one may not wish to reveal his/her mobile phone number. Yet it would be desirable to be able to allow a VoIP call to be initiated from the SN site to a mobile or landline phone if the called party is currently not online at the SN site. Similar SMS- or video-based communications to a mobile handset would also be desirable. In summary, the technical problem at hand is to allow web site community users to initiate contact with other users of that community at traditional telecommunications endpoints without compromising either party's identity.

SUMMARY

One embodiment according to the present method and apparatus encompasses a method. This embodiment of the method may comprise: placing a call from first user equipment in a social network, the at least one user equipment having at least a name identification, to a second user equipment in a telecommunications network, the second user equipment having at least a name identification for use in the social network, and at least a telephone number for use in the telecommunications network; recognizing a call attempt by the first user equipment, and modifying a corresponding IMS invite message; and replacing the name identification of the second user equipment with the telephone number of the second user equipment in order to complete the call without communicating the telephone number of the second user equipment to the first user equipment.

Another embodiment according to the present method and apparatus encompasses an apparatus. This embodiment of the apparatus may comprise: first user equipment having a first set of personal information for use in a community based network, and a second set of personal information for use in a public network; second user equipment having a first set of personal information for use in the community based network, and a second set of personal information for use in the public network; a trusted presence system in an IMS network operatively coupled to the first and second user equipment; and the trusted presence system being structured such that, when the first user equipment is in the community based network places a call to the second user equipment in the public network, the second set of personal information of the second user equipment is withheld from the first user equipment at least during call setup.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

The current art for Social Networking communications is robust (voice, instant messaging, video, email) when both parties are "online" at the SN site. However, when one party is not online, communication cannot occur unless the offline party shares his/her telephone number with the online user. Because it is not known a priori the need to call, it is difficult to share the phone number appropriately beforehand. Invariably, this leads either to a too-wide or too-narrow distribution of personal information. Furthermore, because interactions at such SN sites occur between people with only passing familiarity, personal information is often shared too early to accommodate the need for voice communication to a mobile phone, for example. Finally, it is practically impossible to retract a telephone number once it has been shared.

The Internet today supports a large number of Social Networking (SN) and Community of Interest web sites. Many of these sites allow their members to communicate with each other via VoIP, IM, or video. This mechanism works well for PC-based communications; however, it would be desirable to allow communications to mobile devices while limiting the identity profile information to that which was divulged to the SN site. For example, one may choose to be known only by a "handle" or other alias, and one may not wish to reveal his/her mobile phone number. Yet it would be desirable to be able to allow a VoIP call to be initiated from the SN site to a mobile phone if the called party is currently not online at the SN site. Similar SMS- or video-based communications to a mobile handset would also be desirable. In summary, the technical problem at hand is to allow such communication to occur without revealing additional identification information to either the called or calling party.

Embodiments of the present method and apparatus provide multimedia communications between web site community users and traditional telecommunications endpoints (such as mobile phones). Such communications are allowed to occur without requiring the disclosure of personal information such as actual telephone number. Communication interfaces rely only upon the established web site identification (such as a handle). The actual phone number associated with a given handle is maintained in a trusted presence system and kept secure.

Figure 1:
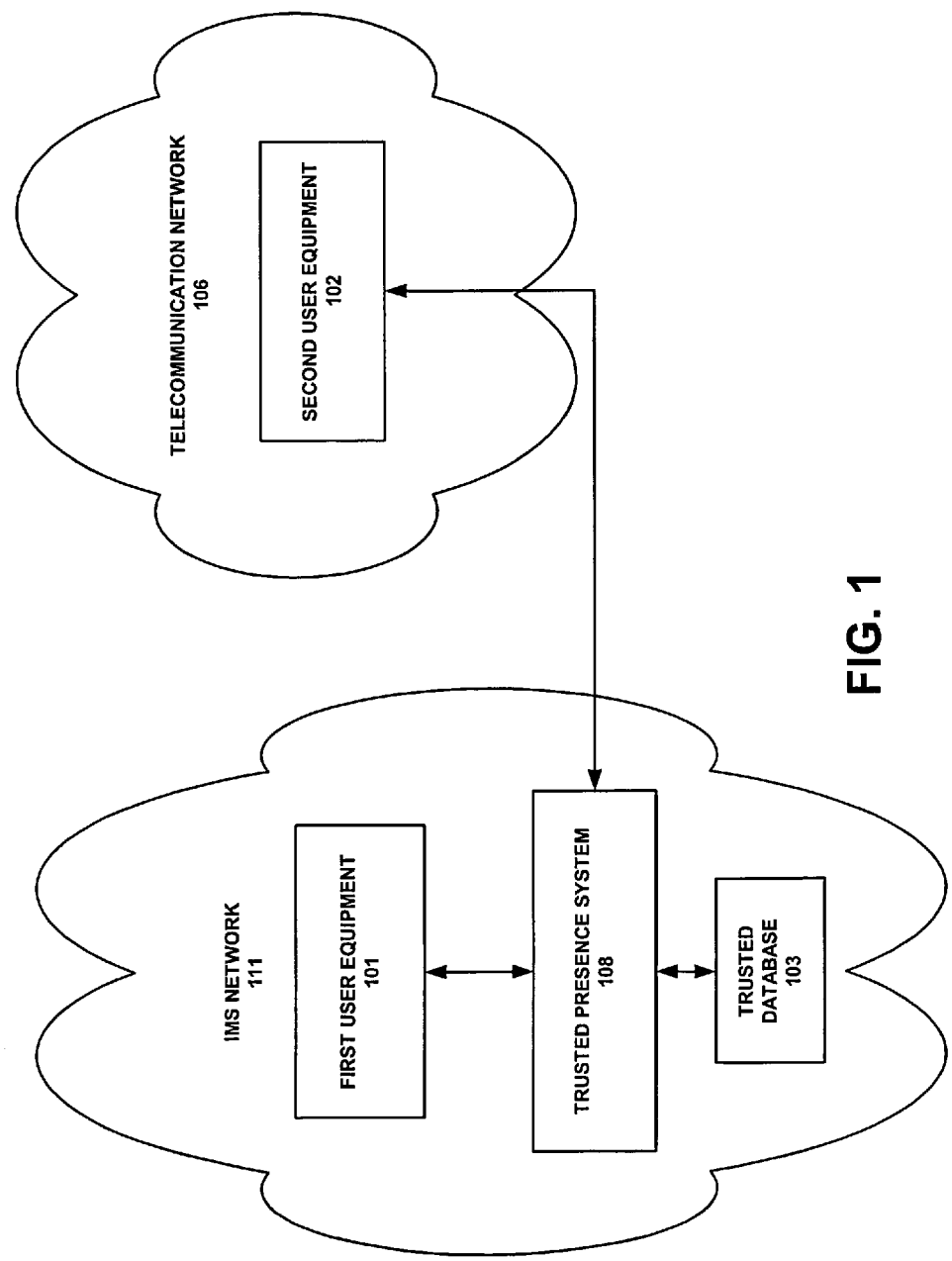
FIG. 1 depicts one example of the use of a trusted presence system according to the present method and apparatus.

FIG. 1 depicts one example of the use of a trusted presence system according to the present method and apparatus. The trusted presence system 108 may be operatively coupled to first user equipment 101 and to a telecommunication network 106. The first user equipment 101 may be, for example, an IMS client. Also the first user equipment 101 and the trusted presence system 108 may be part of an IMS network 111.

The first user equipment 101 may have a "handle" or name associated therewith that may be utilized in various social networks and community based networks. The "handle" or name may generally be referred to as name identification and may be part of personal information associated with the first user equipment 101. The first user equipment 101 may also have a telephone number associated therewith.

The telecommunication network 106 may have second user equipment 102, which may have a first set of personal information, such as name identification, for use, for example, in a social network and a second set of personal information, such as a telephone number, for use in the telecommunication network 106.

The trusted presence system 108 may be operatively coupled to a trusted database 103 that may contain respective the personal information associated with the first user equipment 101 and the second user equipment 102. In particular the trusted database 103 may contain the associations of the respective name and related telephone number for the first user equipment 101 and the second user equipment 102.

In one example, the users of the first and second user equipment 101, 102 may be active in a social network, as well as, having operational mobile equipment, such as a cell phones. Presence information that is gather by the IMS network 111 provides a means of informing the first user equipment 101 as to where the second user equipment 102 may be available. For example, the second user equipment 102 may be currently available via its name in the social network and by its telephone number in the public or telecommunication network 106. The first user equipment 101 may elect to connect to the second user equipment 102 using its telephone number via the trusted presence system 108. The association of the second user equipment name to the telephone number of the second user equipment 102 is stored in the trusted database 103. The trusted presence system 108 may then establish a connection between the first and second user equipment 101, 102 without revealing the telephone number of the second user equipment 102 to the first user equipment 101.

In another example, when the second user equipment 102 is offline with the social network and when the second user equipment 102 receives a call from another user equipment, such as first user equipment 101, that is online with the social network. The telephone number may be used to setup communication with the second user equipment 102 without exposing the telephone number of the second user equipment 102 to the first user equipment 101.

It is a feature of the present method and apparatus to provide a trusted presence system, which includes additional personal information for each consenting SN user. When a particular user is offline from the SN site, the SN buddy-list will indicate the offline user's mobile presence but without revealing the phone number. The presence information is associated with the SN handle only. Should an online user wish to communicate with an offline user, a click-to-call option from the buddy list window initiates the call. The trusted presence system, however, recognizes the call attempt and modifies the IMS Invite message (or equivalent for other communications technologies). It replaces the destination party's handle or name by the actual telephone number, and replaces (or adds) the calling party id with the SN site identifier and user handle (e.g., Jim@MySpace).

Figure 2:
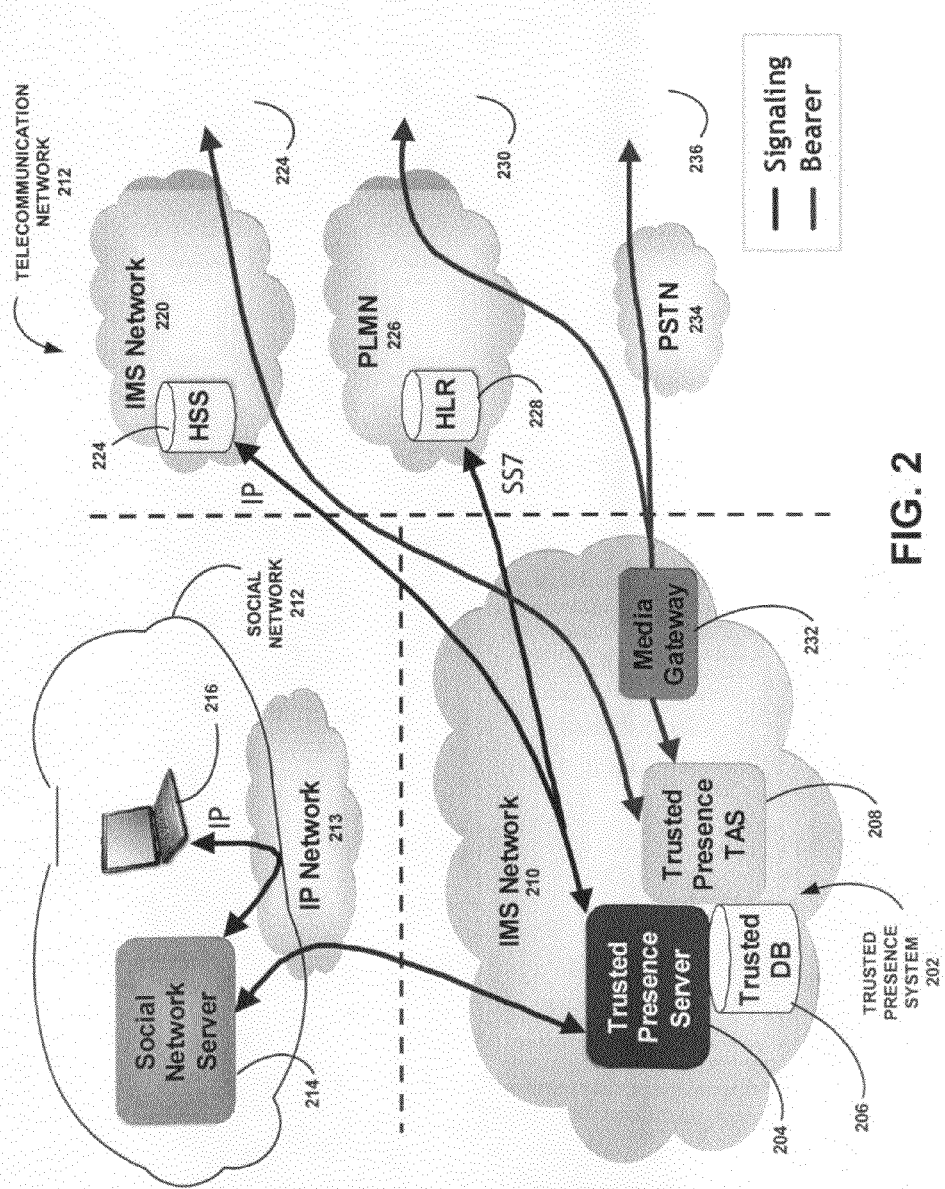
FIG. 2 depicts an embodiment of the present method and apparatus showing a trusted presence system.

FIG. 2 depicts an embodiment of the present method and apparatus showing a trusted presence system. In this embodiment a trusted presence system 202 may have a trusted presence server 204 operatively coupled to a trusted database 206, and a trusted presence telecommunication application server 208 operatively coupled to the trusted presence server 204. In this embodiment the trusted presence system 202 may be part of an IMS network 210. The trusted presence server 202 may be operatively coupled to a social network 212. The social network 212 may have a social network server 214 that is operatively coupled via an IP network 213, such as the Internet, to the trusted presence server 204. Also depicted in this example is terminal, such as laptop 216 that may be operatively coupled to the social network server 214 via the IP network 213.

The telecommunication network 218 may have, for example, an IMS network 220 with an HSS 222 that is operatively coupled to the trusted presence server 204. User equipment 224 may be operatively coupled to the trusted presence telecommunication application server 208 via the IMS network 220.

The telecommunication network 218 may also have, for example, a PLMN network 226 with an HLR 228 that is operatively coupled to the trusted presence server 204. User equipment 230 may be operatively coupled to the trusted presence telecommunication application server 208 via the PLMN network 226 and a media gateway 232.

The telecommunication network 218 may also have, for example, a PSTN network 234. User equipment 236 may be operatively coupled to the trusted presence telecommunication application server 208 via the PSTN network 234 and the media gateway 232.

Figure 3:
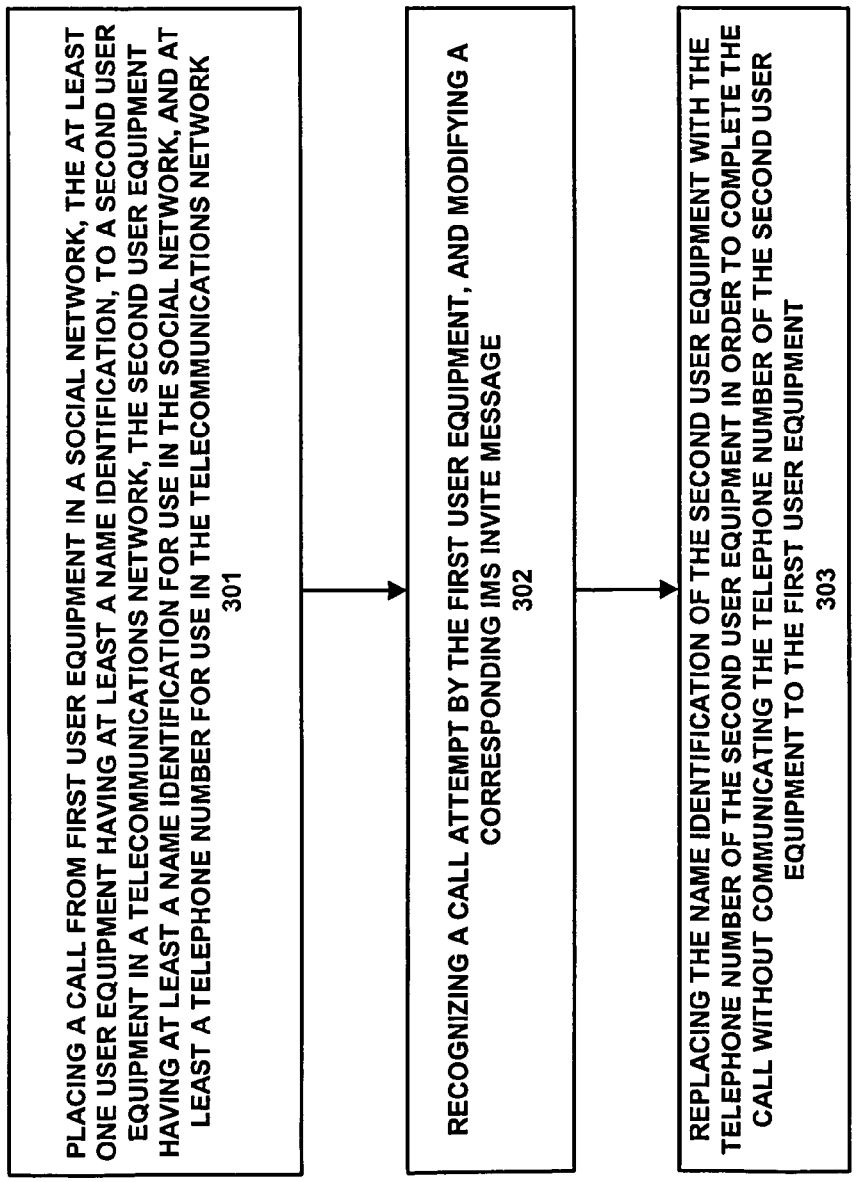
FIG. 3 is a representation of one exemplary flow diagram according to the present method and apparatus.

FIG. 3 is a representation of one exemplary flow diagram according to the present method and apparatus. This embodiment according to the present method and apparatus is a method having the following steps: placing a call from first user equipment in a social network, the at least one user equipment having at least a name identification, to a second user equipment in a telecommunications network, the second user equipment having at least a name identification for use in the social network, and at least a telephone number for use in the telecommunications network (301); recognizing a call attempt by the first user equipment, and modifying a corresponding IMS invite message (302); and replacing the name identification of the second user equipment with the telephone number of the second user equipment in order to complete the call without communicating the telephone number of the second user equipment to the first user equipment (303).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. Examples of a computer-readable signal-bearing medium for the apparatus may comprise the recordable data storage medium (subscriber database). The computer-readable signal-bearing medium for the apparatus in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a trusted presence system operatively coupled to an IP Multimedia Subsystem (IMS) network, said trusted presence system further operatively coupled to a first and a second user equipment, each of said first and second user equipment having a first set of personal information for use with an online social networking website of said IMS network, and a second set of personal information for use in a telecommunications network, the trusted presence system being structured such that, when the first user equipment is accessing the online social networking website and places a call to the second user equipment in the telecommunications network using the second user equipment's first set of personal information, the second set of personal information of the second user equipment is withheld from the first user equipment at least during call setup; and
   a trusted presence database operatively coupled to the trusted presence system for storing associations between first and second sets of personal information.

2. The apparatus according to claim 1, wherein the first set of personal information comprise at least a name identification associated with user equipment for use in the online social networking website, and wherein the second set of personal data comprises at least a telephone number associated with user equipment for use in the telecommunication system.

3. The apparatus according to claim 1, wherein the trusted presence system further comprises a trusted presence server operatively coupled to the trusted database, and a trusted presence telecommunication application server operatively coupled to the trusted presence server, and wherein the trusted presence server is operatively coupled to the IP network, and wherein at least one of the trusted presence server and the trusted presence telecommunication application server is operatively coupled to the telecommunication network.

4. The apparatus according to claim 3, wherein the trusted presence server is operatively coupled to at least one of the IMS network and a PLMN network, and wherein the trusted presence telecommunication application server is operatively coupled to at least one of the IMS network, the PLMN, and a PSTN.

5. The apparatus according to claim 1, wherein the first user equipment is an IMS client.

6. An apparatus, comprising:
   a trusted presence system operatively coupled to an Internet Protocol Multimedia Subsystem (IMS) network having a server for providing access to an online social networking website and said trusted presence system also operatively coupled to a telecommunication network; and
   a trusted presence database, operatively coupled to the trusted presence server, for storing associations between a name identification for use on the social networking website and a telephone number for use in the telecommunications network for at least a first and a second user equipment;
   the trusted presence system structured such that, when the first user equipment is accessing the online social networking website and places a call to connect with the second user equipment in the telecommunications network by using the name identification of the second user equipment, the telephone number of the second user equipment is withheld from the first user equipment at least during call setup.

7. The apparatus according to claim 6, wherein the trusted presence system further comprises a trusted presence server operatively coupled to the trusted database, and a trusted presence telecommunication application server operatively coupled to the trusted presence server.

8. The apparatus according to claim 7, wherein the trusted presence server is operatively coupled to the IMS network.

9. The apparatus according to claim 7, wherein at least one of the trusted presence server and the trusted presence telecommunication application server is operatively coupled to the telecommunication network.

10. The apparatus according to claim 7, wherein the trusted presence server is operatively coupled to at least one of the IMS network and a PLMN network, and wherein the trusted presence telecommunication application server is operatively coupled to at least one of the IMS network, the PLMN, and a PSTN.

11. The apparatus according to claim 7, wherein the trusted presence telecommunication application server recognizes a call attempt by the first user equipment, and modifies a corresponding IMS invite message.

12. The apparatus according to claim 7, wherein the trusted presence server has a mapping functionality relative to at least name identifications and telephone numbers of user equipment.

13. A method, comprising:
   placing a call from first user equipment while accessing an online social networking website, the first user equipment having at least a name identification for use in said online social networking website, to a second user equipment operatively coupled to a telecommunications network, the second user equipment having at least a name identification for use in the online social networking website, and at least a telephone number for use in the telecommunications network;

receiving, by a trusted presence system, a call from the first user equipment using the name identification of the second user equipment, and modifying a corresponding IP Multimedia Subsystem (IMS) invite message to include the name identification of the first user equipment;

accessing, by the trusted presence system, a trusted database containing data related to at least the name identifications and associated telephone numbers of user equipment; and replacing the name identification of the second user equipment with the telephone number of the second user equipment in order to complete the call without communicating the telephone number of the second user equipment to the first user equipment.

14. The method according to claim 13, wherein the trusted presence system comprises a trusted presence server operatively coupled to the trusted database, and a trusted presence telecommunication application server operatively coupled to the trusted presence server.

15. The method according to claim 14, wherein the trusted presence server is operatively coupled to the online social networking website.

16. The method according to claim 15, wherein at least one of the trusted presence server and the trusted presence telecommunication application server is operatively coupled to the telecommunication network.

17. The method according to claim 15, wherein the trusted presence server is operatively coupled to at least one of an IMS network and a PLMN network, and wherein the trusted presence telecommunication application server is operatively coupled to at least one of the IMS network, the PLMN, and a PSTN.

18. The method according to claim 15, wherein the trusted presence telecommunication application server communicates with an online social networking website server via the Internet.

19. The method according to claim 15, wherein the trusted presence server has a mapping functionality relative to at least name identifications and telephone numbers of user equipment.

* * * * *